Figure 1:
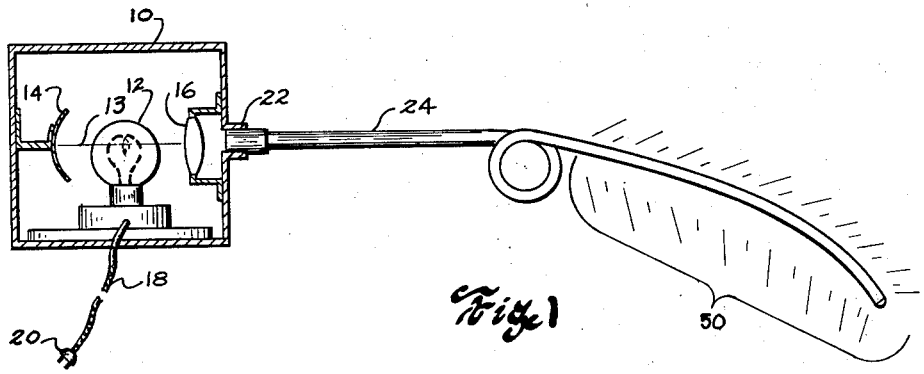

May 5, 1964 R. E. INNIS ETAL 3,131,690
FIBER OPTICS DEVICES
Filed Oct. 22, 1962

INVENTORS
ROBERT E. INNIS
STUART R. JAFFEE

By

ATTORNEY

November 5, 1964

United States Patent Office 3,131,690
Patented May 5, 1964

3,131,690
FIBER OPTICS DEVICES
Robert E. Innis, Southbridge, and Stuart R. Jaffee, Worcester, Mass., assignors to American Optical Company, Southbridge, Mass., a voluntary association of Massachusetts
Filed Oct. 22, 1962, Ser. No. 232,024
7 Claims. (Cl. 128—23)

The present invention relates to medical and surgical instruments and more particularly to equipment for illuminating selected channels or areas of the body during surgical operations.

An object of the present invention is to provide for transillumination of selected areas of the body and particularly the walls of passages or cavities thereof.

Another object of the present invention is to so transilluminate the walls of selected passages in the body as to readily identify and locate them during surgical operations.

A further object of the present invention is to provide a source of relatively high-intensity, cool light distributed with reasonable uniformity over a substantial length.

A further object is the provision of a flexible, relatively high-intensity, cool light source which is readily sterilized by conventional techniques such as treatment in an autoclave.

Still another object of the present invention is to provide means for transilluminating passages of the body, such as the urethra, arteries or veins to avoid the possibility of undesired cutting or puncturing of the walls thereof during surgical operations.

Quite often, for example, during deep surgery of the abdominal cavity the danger exists of undesired cutting or puncturing in the wall of the urethra since substantial variations in the routing of such passage often exist. Such wounds heal with difficulty and often cause local infections; furthermore scar tissue may form within the passage and undesirably restrict the passage of fluid therethrough.

To some extent similar hazards exist with regard to other body passages, particularly the larger veins of the circulatory system.

To attain the aforesaid objects, and others which may appear from the following detailed description, in accordance with one aspect of the present invention, I provide an illuminated flexible translucent probe of a diameter and length suitable for introduction into the passage to be transilluminated, by the probe, substantially uniformly over an extended portion of its length. The light emitted from the probe transilluminates the walls of the passage thus making them glow; the size, route, and disposition of the passage is thus readily discernible to the operating surgeon and he may with ease so direct his operation as to avoid the transilluminated walls.

The illumination along the length of the probe is provided by means of a plurality of light transmitting fibers contained within its hollow interior and all having their one ends in substantially one plane at the butt end of the probe. The fibers are all of different lengths and thus their other ends terminate at spaced points along a portion of the probe near the distal end. A suitable light source is provided to direct a beam of relatively high intensity light against the coplanar ends of light fibers.

The light is directed by multiple reflection along the entire length of each fiber and emerges from the other ends in the form of fairly obtuse cones of light. Reflection from the walls of the adjacent fibers and from the inner wall of the probe and the diffusing effect of the translucent wall all act to provide a substantially uniform emission of diffuse light over that length of the probe.

The present invention will be more fully understood by reference to the following detailed description which is accompanied by a drawing in which FIG. 1 illustrates in elevation and partly in section an embodiment of the present invention.

Figure 2:
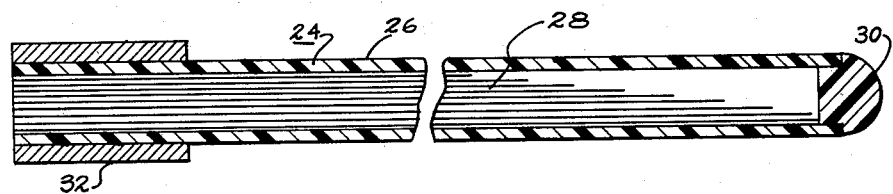
Figure 3:
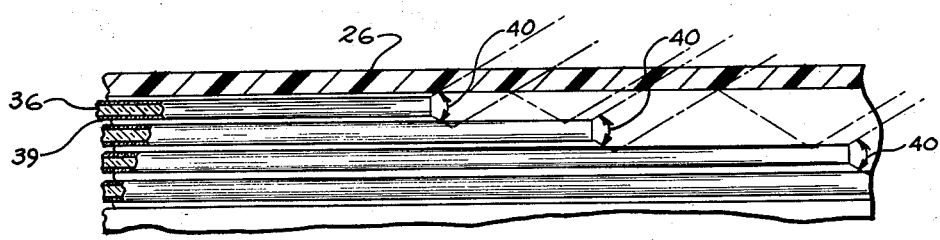

FIG. 2 illustrates in enlarged form a longitudinal cross-section of the improved probe of my invention, while FIG. 3 is a further greatly enlarged sectional view of a portion of FIG. 2.

Referring now to FIG. 1, there is shown a light source within casing 10 in the form of incandescent light bulb 12. Concave mirror 14 and focussing lens 16 are mounted along a common optical axis 13 within casing 10. Casing 10 is preferably light-tight but suitable air ducting means may be provided if desired in order to assure adequate ventilation of the interior of the box. Such air ducting has not been shown since it forms no part of the present invention. Incandescent light bulb 12 is arranged to be connected by means of a conventional electric cord 18 and plug 20 to a suitable source of electric power. Coupling sleeve 22 is mounted in one wall of box 10 in alignment with optical axis 13 so that light from the light bulb 12 is directed and focussed along a path axial of the coupling 22. Coupling 22 is arranged to receive the butt end of probe 24. Mirror 14 and lens 16 produce a cone of light having an apical angle equivalent to the light acceptance angle of probe 24.

As shown in more detail in FIG. 2, probe 24 comprises a translucent outer sleeve 26 and bundle of light conducting fibers 28 therewithin. The distal end of sleeve 26 is hermetically sealed by a translucent plastic block 30 while the proximal end is provided with a metallic coupling sleeve 32 rigidly secured to the casing. Sleeve 32 has an exterior dimension adapted to be snugly received within coupling sleeve 22 of light box 10.

It will be noted from FIG. 2 that each of the light conducting fibers 28 are aligned at the butt end of the probe where it terminates within sleeve 32. Preferably the fibers are cemented, welded or otherwise secured together at this end and the aligned ends are polished to a plane surface. The other ends of fibers 28 terminate at spaced points along the length of the probe near its distal end. While I have shown the fibers 28 in FIG. 2 as terminating in a regular or stepwise fashion it is not necessary that they do so; the longer fibers may be interspersed at random along the shorter fibers instead of all being to one side as shown in the figure. Indeed it is of advantage to utilize a random disposition of the free ends of the fibers since this not only contributes to increased uniformity of illumination of the illuminated portion but contributes to a reduction in the cost of construction.

The light conducting fibers, as shown more clearly in FIG. 3, each comprise a flexible transparent filament or rod 36 of a relatively high index of refraction coated with a thin layer 38 of a transparent material of a lower refractive index. Thus light from light bulb 12 entering each of the cores 36 of the fibers 28 is conducted by internal reflection from one end of the fiber to the other. At the end of the fiber remote from the light source the light emerges as a blunt cone of radiation as indicated by the truncated angles 40 in FIG. 3. Light contained within such cones and striking the translucent casing wall 26 will be conducted therethrough diffusely and spread over a substantial area. That portion of the light contained within each of the cones 40 which is directed away from the adjacent side wall 26 strikes the side wall of another fiber 28. It may be at least partly reflected therefrom and return to the wall 26 for diffused passage therethrough. That which is not reflected from the side wall of the adjacent fiber will either be captured by it and carried to the end of that fiber for radiation at that point, or it will pass through the fiber to the far side of the probe and there be emitted as a diffuse beam of radiation. Since each of the fibers is of differing length, and preferably, the differing lengths are randomly arranged, the portion of the probe between the end of the shortest fiber and the closed end of the probe is substantially uniformly illuminated. This is indicated generally in FIG. 1 at portion 50. Since each of the fibers 28 is small in its cross-sectional dimension it will be quite flexible. Since the fibers are secured together only within the ferrule 32 the whole bundle will contribute very little rigidity to the probe as a whole. It may therefore be inserted in tortuous passages with very little more difficulty than if it were hollow.

A typical probe constructed according to the principles set out above and actually tested was a catheter size 6 French (2 mm. in diameter) and one meter long. The end fitting 32 was one inch long and three-sixteenths of an inch in diameter. The probe contained 140 strands of light conducting fiber each having core 36 of a 1.62 index glass and a cladding 38 of 1.52 index. The numerical aperture of the fiber was thus .5. The light conducting fibers at the distal end were terminated in staggered fashion over a length of approximately twenty centimeters. It should, however, be understood that my invention is not limited to this particular size of probe, nor to the number or kind of fibers used. For some uses it may be desirable to so select the indices of refraction of the core and cladding material so as to give a higher numerical aperture which will give more scattering and a more diffused light source.

Also, my invention is not limited to the use of glass fibers or glass cladding. For some applications it may prove more desirable to use a plastic material of high index of refraction, and a low index plastic cladding, where the ability to withstand high temperature sterilization is not so important. For other applications it may be desirable to use a glass fiber with a plastic cladding.

I claim:

1. A probe for transilluminating extended portions of the walls of a hollow cavity into which it is introduced, comprising a bundle of flexible optical fibers of differing length encased in a flexible translucent sheath, said fibers having all their one ends in alignment, a light source arranged to project a beam of light against said one ends, said fibers terminating at different points spaced apart along a substantial portion of said sheath, whereby said sheath is illuminated along its length from the end of the shortest of said fibers to the end of the longest of said fibers.

2. A probe for transilluminating extended portions of the walls of a hollow cavity into which it is introduced, comprising a bundle of flexible optical fibers of differing length encased in a flexible translucent sheath, said fibers having all their one ends in alignment, a light source arranged to project a beam of light against said one ends, said fibers terminating at different points spaced apart along a substantial portion of said sheath, whereby said sheath is illuminated along its length from the end of the shortest of said fibers to the end of the longest of said fibers, each of said optical fibers comprising a thin elongated filament of a transparent material having a high index of refraction and a coating of a lower index of refraction.

3. A probe for transilluminating extended portions of the walls of a hollow body cavity in which it is introduced comprising a bundle of flexible optical fibers of differing length encased in a flexible translucent sheath, said fibers having all their one ends in alignment at a proximal end of said sheath, said fibers terminating at different points spaced apart along a substantial portion of said sheath adjacent its distal end, said probe being adapted to have a source of light directed against said proximal end whereby said sheath is illuminated along its length from the end of the shortest of said fibers to the said distal end.

4. A probe for transilluminating extended portions of the walls of a hollow cavity into which it is introduced comprising a bundle of flexible optical fibers of differing length encased in a flexible translucent sheath, said fibers having all their one ends in alignment, said fibers terminating at different points spaced apart along a substantial portion of said sheath, said sheath being closed at the end beyond the termination of the longest of said fibers.

5. A probe for transilluminating extended portions of the walls of a hollow cavity in which it is introduced comprising a bundle of flexible optical fibers of differing length encased in a flexible translucent sheath, said fibers having all their one ends secured together in alignment at a proximal end of said sheath, a light source arranged to project a beam of light against said fibers at said proximal end, said fibers being separate for the remainder of their lengths and terminating at different points spaced apart along a substantial portion of said sheath near said distal end, whereby said sheath is illuminated along its length from the end of the shortest of said fibers to said distal end.

6. A flexible extended light source comprising a bundle of flexible optical fibers of differing length encased in a flexible translucent sheath, said fibers having all their one ends in alignment, said fibers terminating at different points spaced apart along a substantial portion of said sheath, said sheath being closed at the end beyond the termination of the longest of said fibers.

7. A flexible extended light source comprising a bundle of flexible optical fibers of differing length encased in a flexible translucent sheath, said fibers having all their one ends in alignment, a light source arranged to project a beam of light against said one ends, said fibers terminating at different points spaced apart along a substantial portion of said sheath, whereby said sheath is illuminated along its length from the end of the shortest of said fibers to the end of the longest of said fibers.

References Cited in the file of this patent

UNITED STATES PATENTS

| | | |
|---|---|---|
| 2,480,178 | Zinberg | Aug. 30, 1949 |
| 2,825,260 | O'Brien | Mar. 4, 1958 |
| 3,068,739 | Hicks et al. | Dec. 18, 1962 |